US 8,626,705 B2

(12) United States Patent
Barrett et al.

(10) Patent No.: US 8,626,705 B2
(45) Date of Patent: Jan. 7, 2014

(54) TRANSACTION AGGREGATOR FOR CLOSED PROCESSING

(75) Inventors: Melyssa Barrett, Tracy, CA (US); Michelle Winters, Belmont, CA (US); Leigh Amaro, Redwood City, CA (US)

(73) Assignee: Visa International Service Association, San Francisco, CA (US)

( * ) Notice: Subject to any disclaimer, the term of this patent is extended or adjusted under 35 U.S.C. 154(b) by 376 days.

(21) Appl. No.: 12/832,699

(22) Filed: Jul. 8, 2010

(65) Prior Publication Data

US 2011/0106840 A1 May 5, 2011

Related U.S. Application Data

(60) Provisional application No. 61/258,462, filed on Nov. 5, 2009.

(51) Int. Cl.
*G06F 7/00* (2006.01)
*G06F 17/00* (2006.01)

(52) U.S. Cl.
USPC .......................................... 707/603

(58) Field of Classification Search
USPC ................................. 707/600, 603
See application file for complete search history.

(56) References Cited

U.S. PATENT DOCUMENTS

| | | |
|---|---|---|
| 4,914,590 A | 4/1990 | Loatman et al. |
| 5,401,946 A | 3/1995 | Weinblatt |
| 5,592,560 A | 1/1997 | Deaton et al. |
| 5,621,812 A | 4/1997 | Deaton et al. |
| 5,638,457 A | 6/1997 | Deaton et al. |
| 5,675,510 A | 10/1997 | Coffey et al. |
| 5,684,990 A | 11/1997 | Boothby |
| 5,687,322 A | 11/1997 | Deaton et al. |
| 5,692,017 A | 11/1997 | Shiokawa |
| 5,710,886 A | 1/1998 | Christensen et al. |
| 5,717,923 A | 2/1998 | Dedrick |
| 5,924,080 A | 7/1999 | Johnson et al. |
| 5,974,396 A | 10/1999 | Anderson et al. |
| 6,012,094 A | 1/2000 | Leymann et al. |
| 6,035,280 A | 3/2000 | Christensen et al. |
| 6,055,573 A | 4/2000 | Gardenswartz et al. |
| 6,061,660 A | 5/2000 | Eggleston et al. |

(Continued)

FOREIGN PATENT DOCUMENTS

| | | |
|---|---|---|
| JP | 2000357204 | 12/2000 |
| JP | 2001175761 | 6/2001 |

(Continued)

OTHER PUBLICATIONS

International Patent Application PCT/US2011/037769, International Search Report and Written Opinion, Janaury 9, 2012.

(Continued)

*Primary Examiner* — Jeffrey A Burke
(74) *Attorney, Agent, or Firm* — Loeb & Loeb LLP

(57) ABSTRACT

Systems and methods for determining aggregated transaction level data for specific group characteristics are provided. Aggregated transaction level data can be used for target marketing campaigns by looking at past and potential spending habits of populations with group characteristics specified in the transaction data aggregates. The aggregates can also be used to measure the effectiveness of a particular marketing campaign by correlating the spending patters of a particular group with sales resulting from the campaign.

25 Claims, 7 Drawing Sheets

(56) References Cited

U.S. PATENT DOCUMENTS

| | | |
|---|---|---|
| 6,070,147 A | 5/2000 | Harms et al. |
| 6,101,484 A | 8/2000 | Halbert et al. |
| 6,119,101 A | 9/2000 | Peckover |
| 6,216,129 B1 | 4/2001 | Eldering |
| 6,282,516 B1 | 8/2001 | Giuliani |
| 6,282,522 B1 | 8/2001 | Davis |
| 6,285,983 B1 | 9/2001 | Jenkins |
| 6,298,330 B1 | 10/2001 | Gardenswartz |
| 6,307,958 B1 | 10/2001 | Deaton et al. |
| 6,321,201 B1 | 11/2001 | Jenkins |
| 6,324,519 B1 | 11/2001 | Eldering |
| 6,332,126 B1 | 12/2001 | Peirce et al. |
| 6,334,110 B1 * | 12/2001 | Walter et al. ............... 705/14.41 |
| 6,377,935 B1 | 4/2002 | Deaton et al. |
| 6,430,539 B1 * | 8/2002 | Lazarus et al. ............... 705/7.31 |
| 6,450,407 B1 | 9/2002 | Freeman et al. |
| 6,505,168 B1 | 1/2003 | Rothman |
| 6,519,571 B1 | 2/2003 | Guheen |
| 6,604,089 B1 | 8/2003 | Van Horn et al. |
| 6,604,239 B1 | 8/2003 | Kohen |
| 6,631,356 B1 | 10/2003 | Van Horn et al. |
| 6,631,372 B1 | 10/2003 | Graham |
| 6,658,393 B1 | 12/2003 | Basch et al. |
| 6,742,003 B2 | 5/2004 | Heckerman et al. |
| 6,834,110 B1 | 12/2004 | Marconcini et al. |
| 6,839,682 B1 | 1/2005 | Blume et al. |
| 6,856,992 B2 | 2/2005 | Britton et al. |
| 6,873,979 B2 | 3/2005 | Fishman et al. |
| 6,901,406 B2 | 5/2005 | Nabe |
| 6,922,686 B2 | 7/2005 | Okamoto et al. |
| 6,925,441 B1 * | 8/2005 | Jones et al. ................... 705/7.33 |
| 6,934,508 B2 | 8/2005 | Ceresoli et al. |
| 6,934,690 B1 | 8/2005 | Van Horn et al. |
| 6,938,022 B1 | 8/2005 | Singhal |
| 6,941,376 B2 | 9/2005 | Mitchell et al. |
| 6,996,560 B1 | 2/2006 | Choi |
| 7,003,476 B1 | 2/2006 | Samra |
| 7,024,374 B1 | 4/2006 | Day |
| 7,024,409 B2 | 4/2006 | Iyengar |
| 7,028,052 B2 | 4/2006 | Chapman et al. |
| 7,035,855 B1 | 4/2006 | Kilger et al. |
| 7,039,599 B2 | 5/2006 | Merriman |
| 7,062,510 B1 | 6/2006 | Eldering |
| 7,072,847 B2 | 7/2006 | Ulenas et al. |
| 7,107,230 B1 | 9/2006 | Halbert et al. |
| 7,107,249 B2 | 9/2006 | Dively |
| 7,120,590 B1 | 10/2006 | Eisen |
| 7,124,099 B2 | 10/2006 | Mesaros |
| 7,146,330 B1 | 12/2006 | Alon et al. |
| 7,158,943 B2 | 1/2007 | Van Der Riet |
| 7,158,955 B2 | 1/2007 | Diveley |
| 7,162,436 B1 | 1/2007 | Eckel, Jr. |
| 7,165,037 B2 | 1/2007 | Lazarus et al. |
| 7,177,822 B2 | 2/2007 | Mahmood et al. |
| 7,181,412 B1 | 2/2007 | Fulgoni et al. |
| 7,181,419 B1 | 2/2007 | Mesaros |
| 7,194,422 B1 | 3/2007 | St. John Killick |
| 7,194,427 B1 | 3/2007 | Van Horn et al. |
| 7,225,142 B1 | 5/2007 | Apte |
| 7,260,837 B2 | 8/2007 | Abraham |
| 7,263,498 B1 | 8/2007 | Van Horn et al. |
| 7,264,152 B2 | 9/2007 | Tsuei et al. |
| 7,269,578 B2 | 9/2007 | Sweeney |
| 7,299,194 B1 | 11/2007 | Manganaris |
| 7,328,169 B2 | 2/2008 | Temares |
| 7,333,998 B2 | 2/2008 | Heckerman et al. |
| 7,337,127 B1 | 2/2008 | Smith |
| 7,340,438 B2 | 3/2008 | Nordman et al. |
| 7,360,251 B2 | 4/2008 | Spalink et al. |
| 7,363,246 B1 | 4/2008 | Van Horn et al. |
| 7,373,311 B2 | 5/2008 | Lambert et al. |
| 7,401,731 B1 | 7/2008 | Pletz et al. |
| 7,424,439 B1 | 9/2008 | Fayyad et al. |
| 7,424,441 B2 | 9/2008 | George |
| 7,444,658 B1 | 10/2008 | Matz et al. |
| 7,451,134 B2 | 11/2008 | Krakowiecki et al. |
| 7,480,627 B1 | 1/2009 | Van Horn et al. |
| 7,490,052 B2 | 2/2009 | Kilger et al. |
| 7,493,655 B2 | 2/2009 | Brown |
| 7,526,485 B2 | 4/2009 | Hagan et al. |
| 7,533,038 B2 | 5/2009 | Blume |
| 7,533,130 B2 | 5/2009 | Narayana et al. |
| 7,536,360 B2 | 5/2009 | Stolfo et al. |
| 7,542,993 B2 | 6/2009 | Satterfield et al. |
| 7,552,069 B2 | 6/2009 | Kepecs |
| 7,562,030 B1 | 7/2009 | Shapira |
| 7,578,430 B2 | 8/2009 | Michelsen |
| 7,578,435 B2 | 8/2009 | Suk |
| 7,580,884 B2 | 8/2009 | Cook |
| 7,593,871 B1 | 9/2009 | Mesaros |
| 7,613,628 B2 | 11/2009 | Ariff et al. |
| 7,668,832 B2 * | 2/2010 | Yeh et al. ...................... 707/770 |
| 7,689,463 B1 | 3/2010 | Mesaros |
| 7,689,469 B1 | 3/2010 | Mesaros |
| 7,693,748 B1 | 4/2010 | Mesaros |
| 7,729,945 B1 | 6/2010 | Katz et al. |
| 7,729,977 B2 | 6/2010 | Xiao |
| 7,747,473 B1 | 6/2010 | Mesaros |
| 7,828,206 B2 | 11/2010 | Hessburg et al. |
| 7,904,337 B2 | 3/2011 | Morsa |
| 7,917,388 B2 | 3/2011 | Van Der Riet |
| 7,937,286 B2 * | 5/2011 | Newman et al. .............. 705/7.31 |
| 7,953,219 B2 | 5/2011 | Freedman et al. |
| 7,996,521 B2 * | 8/2011 | Chamberlain et al. ........ 709/224 |
| 8,010,337 B2 | 8/2011 | Narayanan et al. |
| 8,055,536 B1 | 11/2011 | Olaiya et al. |
| 8,073,950 B2 * | 12/2011 | Goodermote et al. ........ 709/226 |
| 8,086,528 B2 | 12/2011 | Barrett et al. |
| 8,103,545 B2 | 1/2012 | Ramer et al. |
| 8,131,875 B1 | 3/2012 | Chen et al. |
| 8,140,389 B2 | 3/2012 | Altberg et al. |
| 8,175,908 B1 * | 5/2012 | Anderson .................... 705/7.29 |
| 8,255,268 B2 * | 8/2012 | Rane et al. ................... 705/7.33 |
| 2001/0027413 A1 | 10/2001 | Bhutta |
| 2001/0049620 A1 | 12/2001 | Blasko |
| 2002/0004733 A1 | 1/2002 | Addante |
| 2002/0032602 A1 | 3/2002 | Lanzillo et al. |
| 2002/0032904 A1 | 3/2002 | Lerner |
| 2002/0042738 A1 | 4/2002 | Srinivasanet et al. |
| 2002/0046187 A1 | 4/2002 | Vargaset et al. |
| 2002/0053076 A1 | 5/2002 | Landesmann |
| 2002/0059100 A1 | 5/2002 | Shore |
| 2002/0065723 A1 | 5/2002 | Anderson et al. |
| 2002/0072931 A1 | 6/2002 | Card |
| 2002/0099649 A1 | 7/2002 | Lee et al. |
| 2002/0107738 A1 | 8/2002 | Beach et al. |
| 2002/0123928 A1 | 9/2002 | Eldering et al. |
| 2002/0128908 A1 | 9/2002 | Levin et al. |
| 2002/0138346 A1 | 9/2002 | Kodaka |
| 2002/0147645 A1 | 10/2002 | Alao et al. |
| 2002/0147670 A1 | 10/2002 | Lange |
| 2002/0161625 A1 | 10/2002 | Brito-Valladares et al. |
| 2002/0174013 A1 | 11/2002 | Freeman et al. |
| 2003/0004808 A1 | 1/2003 | Elhaoussine et al. |
| 2003/0018652 A1 | 1/2003 | Heckerman et al. |
| 2003/0047602 A1 | 3/2003 | Iida et al. |
| 2003/0061132 A1 | 3/2003 | Yu, Sr. et al. |
| 2003/0074267 A1 | 4/2003 | Acharya et al. |
| 2003/0078864 A1 | 4/2003 | Hardesty et al. |
| 2003/0115113 A1 | 6/2003 | Duncan |
| 2003/0191832 A1 | 10/2003 | Satyavolu et al. |
| 2003/0225659 A1 * | 12/2003 | Breeden et al. ................. 705/36 |
| 2004/0010458 A1 | 1/2004 | Friedman |
| 2004/0019518 A1 | 1/2004 | Abraham |
| 2004/0024632 A1 | 2/2004 | Perry |
| 2004/0039742 A1 | 2/2004 | Barsness et al. |
| 2004/0054581 A1 | 3/2004 | Redford |
| 2004/0054591 A1 | 3/2004 | Spaeth et al. |
| 2004/0073482 A1 | 4/2004 | Wiggins et al. |
| 2004/0107123 A1 | 6/2004 | Haffner et al. |
| 2004/0122735 A1 | 6/2004 | Meshkin |
| 2004/0122736 A1 | 6/2004 | Strock et al. |
| 2004/0127192 A1 | 7/2004 | Ceresoli et al. |
| 2004/0133474 A1 | 7/2004 | Tami et al. |

(56) References Cited

U.S. PATENT DOCUMENTS

| | | |
|---|---|---|
| 2004/0181554 A1 | 9/2004 | Heckerman et al. |
| 2004/0193489 A1 | 9/2004 | Boyd et al. |
| 2004/0193685 A1 | 9/2004 | Proehl |
| 2004/0225509 A1 | 11/2004 | Andre |
| 2004/0225603 A1 | 11/2004 | Allen et al. |
| 2004/0249650 A1 | 12/2004 | Freedman et al. |
| 2005/0021397 A1 | 1/2005 | Cui et al. |
| 2005/0055275 A1* | 3/2005 | Newman et al. ............. 705/14 |
| 2005/0071225 A1 | 3/2005 | Bortolin et al. |
| 2005/0071227 A1 | 3/2005 | Hammad et al. |
| 2005/0071230 A1 | 3/2005 | Mankoff |
| 2005/0071307 A1 | 3/2005 | Snyder |
| 2005/0131762 A1 | 6/2005 | Bharat et al. |
| 2005/0131792 A1 | 6/2005 | Rowe |
| 2005/0149455 A1 | 7/2005 | Bruesewitz et al. |
| 2005/0160002 A1 | 7/2005 | Roetter |
| 2005/0160003 A1 | 7/2005 | Berardi et al. |
| 2005/0197954 A1* | 9/2005 | Maitland et al. ............. 705/39 |
| 2005/0216823 A1 | 9/2005 | Petersen et al. |
| 2006/0053056 A1 | 3/2006 | Alspach-Goss et al. |
| 2006/0069619 A1 | 3/2006 | Walker et al. |
| 2006/0143071 A1 | 6/2006 | Hofmann |
| 2006/0143075 A1 | 6/2006 | Carr et al. |
| 2006/0161527 A1 | 7/2006 | Dwork et al. |
| 2006/0167818 A1 | 7/2006 | Wentker et al. |
| 2006/0178957 A1 | 8/2006 | LeClaire |
| 2006/0190337 A1 | 8/2006 | Ayers, Jr. |
| 2006/0218038 A1 | 9/2006 | Grider |
| 2006/0218087 A1 | 9/2006 | Zimmerman |
| 2006/0230053 A1 | 10/2006 | Eldering |
| 2006/0242047 A1 | 10/2006 | Haggerty et al. |
| 2006/0242051 A1 | 10/2006 | Haggerty et al. |
| 2006/0253320 A1 | 11/2006 | Heywood |
| 2006/0253323 A1 | 11/2006 | Phan et al. |
| 2006/0265280 A1 | 11/2006 | Nakada et al. |
| 2006/0265429 A1 | 11/2006 | Pendergast |
| 2006/0287916 A1 | 12/2006 | Starr et al. |
| 2006/0293948 A1 | 12/2006 | Weinblatt |
| 2007/0011194 A1 | 1/2007 | Gurevich |
| 2007/0033104 A1 | 2/2007 | Collins et al. |
| 2007/0038516 A1 | 2/2007 | Apple et al. |
| 2007/0055597 A1 | 3/2007 | Patel |
| 2007/0067297 A1 | 3/2007 | Kublickis et al. |
| 2007/0073585 A1 | 3/2007 | Apple et al. |
| 2007/0084917 A1 | 4/2007 | Fajkowski |
| 2007/0100691 A1 | 5/2007 | Patterson et al. |
| 2007/0100719 A1 | 5/2007 | Chwast et al. |
| 2007/0124201 A1 | 5/2007 | Hu et al. |
| 2007/0140483 A1 | 6/2007 | Jin et al. |
| 2007/0156517 A1 | 7/2007 | Kaplan et al. |
| 2007/0162377 A1 | 7/2007 | Williams |
| 2007/0162457 A1 | 7/2007 | Barcia et al. |
| 2007/0168246 A1 | 7/2007 | Haggerty et al. |
| 2007/0174295 A1 | 7/2007 | Abraham |
| 2007/0185844 A1 | 8/2007 | Schachter |
| 2007/0192121 A1 | 8/2007 | Routson |
| 2007/0192122 A1 | 8/2007 | Routson et al. |
| 2007/0214076 A1 | 9/2007 | Robida et al. |
| 2007/0219865 A1 | 9/2007 | Leining |
| 2007/0219866 A1 | 9/2007 | Wolf et al. |
| 2007/0220030 A1 | 9/2007 | Bollinger et al. |
| 2007/0226056 A1 | 9/2007 | Belanger |
| 2007/0226061 A1 | 9/2007 | Chen et al. |
| 2007/0233571 A1 | 10/2007 | Eldering et al. |
| 2007/0239532 A1 | 10/2007 | Benson et al. |
| 2007/0244741 A1 | 10/2007 | Blume |
| 2007/0260521 A1 | 11/2007 | Van Der Riet |
| 2007/0260736 A1 | 11/2007 | Miller |
| 2007/0265923 A1 | 11/2007 | Krassner et al. |
| 2007/0282681 A1 | 12/2007 | Shubert et al. |
| 2008/0004884 A1 | 1/2008 | Flake |
| 2008/0021772 A1 | 1/2008 | Aloni et al. |
| 2008/0033852 A1 | 2/2008 | Megdal et al. |
| 2008/0046358 A1 | 2/2008 | Holm-Blagg |
| 2008/0059302 A1 | 3/2008 | Fordyce, III |
| 2008/0059303 A1 | 3/2008 | Fordyce, III |
| 2008/0059306 A1 | 3/2008 | Fordyce, III |
| 2008/0059307 A1 | 3/2008 | Fordyce, III |
| 2008/0065507 A1 | 3/2008 | Morrison et al. |
| 2008/0071571 A1 | 3/2008 | Kim et al. |
| 2008/0071587 A1 | 3/2008 | Granucci et al. |
| 2008/0071680 A1 | 3/2008 | Sheets |
| 2008/0077487 A1 | 3/2008 | Davis |
| 2008/0077499 A1 | 3/2008 | Ariff et al. |
| 2008/0082393 A1 | 4/2008 | Ozzie et al. |
| 2008/0082397 A1 | 4/2008 | Dennison et al. |
| 2008/0082418 A1 | 4/2008 | Fordyce, III |
| 2008/0091720 A1 | 4/2008 | Klumpp et al. |
| 2008/0103887 A1 | 5/2008 | Oldham |
| 2008/0103888 A1 | 5/2008 | Weir |
| 2008/0120182 A1 | 5/2008 | Arnold et al. |
| 2008/0120218 A1 | 5/2008 | Reid et al. |
| 2008/0133351 A1 | 6/2008 | White et al. |
| 2008/0134228 A1 | 6/2008 | Dion et al. |
| 2008/0147731 A1 | 6/2008 | Narayana et al. |
| 2008/0154703 A1 | 6/2008 | Flake |
| 2008/0154704 A1 | 6/2008 | Flake |
| 2008/0154727 A1 | 6/2008 | Carlson |
| 2008/0162258 A1 | 7/2008 | Kala et al. |
| 2008/0162269 A1 | 7/2008 | Gilbert |
| 2008/0167991 A1 | 7/2008 | Carlson et al. |
| 2008/0167992 A1 | 7/2008 | Kokernak |
| 2008/0177602 A1 | 7/2008 | Sopher et al. |
| 2008/0184117 A1 | 7/2008 | Alsbury et al. |
| 2008/0189202 A1 | 8/2008 | Zadoorian et al. |
| 2008/0195465 A1 | 8/2008 | Redmond et al. |
| 2008/0195473 A1 | 8/2008 | Laramy |
| 2008/0201226 A1 | 8/2008 | Carlson |
| 2008/0215436 A1 | 9/2008 | Roberts et al. |
| 2008/0217397 A1 | 9/2008 | Degliantoni et al. |
| 2008/0221970 A1 | 9/2008 | Megdal et al. |
| 2008/0221971 A1 | 9/2008 | Megdal et al. |
| 2008/0221972 A1 | 9/2008 | Megdal et al. |
| 2008/0221973 A1 | 9/2008 | Megdal et al. |
| 2008/0221990 A1 | 9/2008 | Megdal et al. |
| 2008/0222015 A1 | 9/2008 | Megdal et al. |
| 2008/0222027 A1 | 9/2008 | Megdal et al. |
| 2008/0228538 A1 | 9/2008 | Megdal et al. |
| 2008/0228539 A1 | 9/2008 | Megdal et al. |
| 2008/0228540 A1 | 9/2008 | Megdal et al. |
| 2008/0228556 A1 | 9/2008 | Megdal et al. |
| 2008/0228635 A1 | 9/2008 | Megdal et al. |
| 2008/0235243 A1 | 9/2008 | Lee et al. |
| 2008/0242317 A1 | 10/2008 | Abhyanker |
| 2008/0243680 A1 | 10/2008 | Megdal et al. |
| 2008/0275771 A1 | 11/2008 | Levine |
| 2008/0281668 A1 | 11/2008 | Nurminen |
| 2008/0281699 A1 | 11/2008 | Whitehead |
| 2008/0300973 A1 | 12/2008 | DeWitt et al. |
| 2008/0301037 A1 | 12/2008 | Monk |
| 2008/0301102 A1 | 12/2008 | Liang |
| 2008/0306790 A1 | 12/2008 | Otto |
| 2008/0318559 A1 | 12/2008 | Porco et al. |
| 2008/0319843 A1 | 12/2008 | Moser |
| 2008/0319847 A1 | 12/2008 | Shepard |
| 2008/0320512 A1 | 12/2008 | Knight |
| 2009/0006363 A1 | 1/2009 | Canny |
| 2009/0018895 A1 | 1/2009 | Weinblatt |
| 2009/0030793 A1 | 1/2009 | Fordyce, III |
| 2009/0036103 A1 | 2/2009 | Byerley et al. |
| 2009/0043593 A1 | 2/2009 | Herbrich et al. |
| 2009/0048884 A1 | 2/2009 | Olives et al. |
| 2009/0070219 A1 | 3/2009 | D'Angelo |
| 2009/0070225 A1 | 3/2009 | Matz et al. |
| 2009/0076896 A1 | 3/2009 | DeWitt et al. |
| 2009/0112703 A1 | 4/2009 | Brown |
| 2009/0112721 A1 | 4/2009 | Hammad et al. |
| 2009/0119160 A1 | 5/2009 | Woda |
| 2009/0119167 A1 | 5/2009 | Kendall |
| 2009/0119170 A1 | 5/2009 | Hammad et al. |
| 2009/0125396 A1 | 5/2009 | Otto et al. |
| 2009/0125439 A1* | 5/2009 | Zarikian et al. ............. 705/38 |
| 2009/0132347 A1 | 5/2009 | Anderson et al. |
| 2009/0132365 A1 | 5/2009 | Gruenhagen et al. |

(56) References Cited

U.S. PATENT DOCUMENTS

| | | |
|---|---|---|
| 2009/0132366 A1 | 5/2009 | Lam |
| 2009/0132395 A1 | 5/2009 | Lam |
| 2009/0132404 A1 | 5/2009 | King et al. |
| 2009/0144122 A1 | 6/2009 | Ginsberg et al. |
| 2009/0144146 A1 | 6/2009 | Levine et al. |
| 2009/0144201 A1 | 6/2009 | Gierkink et al. |
| 2009/0157511 A1 | 6/2009 | Spinnell |
| 2009/0157512 A1 | 6/2009 | King |
| 2009/0172551 A1 | 7/2009 | Kane |
| 2009/0172728 A1 | 7/2009 | Shkedi et al. |
| 2009/0182625 A1 | 7/2009 | Kilger et al. |
| 2009/0187462 A1 | 7/2009 | Gevelber et al. |
| 2009/0192882 A1 | 7/2009 | Narahashi |
| 2009/0204472 A1 | 8/2009 | Einhorn |
| 2009/0216579 A1 | 8/2009 | Zen et al. |
| 2009/0216606 A1 | 8/2009 | Coffman et al. |
| 2009/0216616 A1 | 8/2009 | Wang et al. |
| 2009/0222323 A1 | 9/2009 | Kelly |
| 2009/0222373 A1* | 9/2009 | Choudhuri et al. ............. 705/38 |
| 2009/0234708 A1 | 9/2009 | Heiser, II |
| 2009/0234711 A1 | 9/2009 | Ramer et al. |
| 2009/0234715 A1* | 9/2009 | Heiser et al. ................. 705/10 |
| 2009/0234737 A1 | 9/2009 | Sarelson |
| 2009/0248496 A1 | 10/2009 | Hueter |
| 2009/0248497 A1 | 10/2009 | Hueter |
| 2009/0248511 A1 | 10/2009 | Mehta et al. |
| 2009/0249384 A1 | 10/2009 | Fang et al. |
| 2009/0254414 A1 | 10/2009 | Schwarz et al. |
| 2009/0254476 A1 | 10/2009 | Sharma |
| 2009/0259518 A1 | 10/2009 | Harvey |
| 2009/0271305 A1 | 10/2009 | Lal et al. |
| 2009/0271327 A1 | 10/2009 | Lal |
| 2009/0271428 A1 | 10/2009 | Adelman et al. |
| 2009/0276317 A1 | 11/2009 | Dixon et al. |
| 2009/0292619 A1 | 11/2009 | Kagan et al. |
| 2009/0299846 A1 | 12/2009 | Brueggemann et al. |
| 2010/0030644 A1 | 2/2010 | Dhamodharan |
| 2010/0042517 A1 | 2/2010 | Paintin et al. |
| 2010/0049620 A1 | 2/2010 | Debow |
| 2010/0057549 A1 | 3/2010 | Boal |
| 2010/0057586 A1 | 3/2010 | Chow |
| 2010/0106568 A1 | 4/2010 | Grimes |
| 2010/0106569 A1 | 4/2010 | Grimes |
| 2010/0114677 A1 | 5/2010 | Carlson |
| 2010/0114683 A1 | 5/2010 | Wessels |
| 2010/0114686 A1 | 5/2010 | Carlson |
| 2010/0125546 A1 | 5/2010 | Barrett et al. |
| 2010/0125547 A1 | 5/2010 | Barrett et al. |
| 2010/0153242 A1 | 6/2010 | Preston |
| 2010/0161379 A1* | 6/2010 | Bene et al. ................. 705/10 |
| 2010/0174607 A1 | 7/2010 | Henkin et al. |
| 2010/0174623 A1 | 7/2010 | McPhie et al. |
| 2010/0191594 A1 | 7/2010 | White et al. |
| 2010/0250338 A1 | 9/2010 | Banerjee |
| 2010/0257404 A1 | 10/2010 | Singh et al. |
| 2010/0274625 A1 | 10/2010 | Carlson |
| 2010/0274627 A1 | 10/2010 | Carlson |
| 2010/0280880 A1 | 11/2010 | Faith |
| 2010/0280881 A1 | 11/2010 | Faith |
| 2010/0280882 A1 | 11/2010 | Faith |
| 2010/0280927 A1 | 11/2010 | Faith |
| 2010/0280950 A1 | 11/2010 | Faith |
| 2010/0306029 A1 | 12/2010 | Jolley |
| 2010/0306032 A1 | 12/2010 | Jolley |
| 2011/0016103 A1 | 1/2011 | Sivakumar et al. |
| 2011/0022424 A1 | 1/2011 | Von Derheide |
| 2011/0035278 A1 | 2/2011 | Fordyce, III |
| 2011/0035280 A1 | 2/2011 | Fordyce, III |
| 2011/0035288 A1 | 2/2011 | Clyne |
| 2011/0047072 A1 | 2/2011 | Ciurea |
| 2011/0087519 A1 | 4/2011 | Fordyce, III |
| 2011/0087530 A1 | 4/2011 | Fordyce, III |
| 2011/0087531 A1 | 4/2011 | Winters et al. |
| 2011/0087546 A1 | 4/2011 | Fordyce, III |
| 2011/0087547 A1 | 4/2011 | Amaro et al. |
| 2011/0087550 A1 | 4/2011 | Fordyce, III |
| 2011/0093324 A1 | 4/2011 | Fordyce, III et al. |
| 2011/0093327 A1 | 4/2011 | Fordyce, III et al. |
| 2011/0093335 A1 | 4/2011 | Fordyce, III et al. |
| 2011/0125565 A1 | 5/2011 | MacIlwaine et al. |
| 2011/0238538 A1* | 9/2011 | Allison et al. ................. 705/30 |
| 2011/0276383 A1 | 11/2011 | Heiser et al. |
| 2011/0288918 A1 | 11/2011 | Cervenka |
| 2011/0302022 A1 | 12/2011 | Fordyce, III |
| 2011/0302036 A1 | 12/2011 | Fordyce, III |
| 2011/0302039 A1 | 12/2011 | Fordyce, III |
| 2012/0109709 A1 | 5/2012 | Fordyce, III et al. |
| 2012/0109734 A1 | 5/2012 | Fordyce, III et al. |
| 2012/0185315 A1 | 7/2012 | Von Derheide et al. |
| 2012/0191525 A1 | 7/2012 | Singh |
| 2012/0215610 A1 | 8/2012 | Amaro et al. |

FOREIGN PATENT DOCUMENTS

| | | |
|---|---|---|
| JP | 2003108897 | 4/2003 |
| JP | 2006301866 | 11/2006 |
| JP | 2007102340 | 4/2007 |
| JP | 2007-219651 | 8/2007 |
| JP | 2007317209 | 12/2007 |
| KR | 1020000037128 | 7/2000 |
| KR | 20020074271 | 9/2002 |
| KR | 20030080797 | 10/2003 |
| KR | 10-2004-0017547 | 2/2004 |
| KR | 20040040253 | 5/2004 |
| KR | 20040107715 | 12/2004 |
| KR | 1020050024746 | 3/2005 |
| KR | 1020070043329 | 4/2005 |
| KR | 20050078135 | 8/2005 |
| KR | 20050089523 | 9/2005 |
| KR | 20060034983 | 4/2006 |
| KR | 20060095895 | 9/2006 |
| KR | 20070030415 | 3/2007 |
| KR | 20070070588 | 7/2007 |
| KR | 20070075986 | 7/2007 |
| KR | 100761398 | 9/2007 |
| KR | 20080104398 | 12/2008 |
| KR | 100883700 | 2/2009 |
| KR | 1020090016353 | 2/2009 |
| KR | 1020090059922 | 6/2009 |
| WO | 9922328 | 5/1999 |
| WO | 9950775 | 10/1999 |
| WO | 00/62231 | 10/2000 |
| WO | 0060435 | 10/2000 |
| WO | 0062231 | 10/2000 |
| WO | 01/37183 | 5/2001 |
| WO | 0137183 | 5/2001 |
| WO | 0139023 | 5/2001 |
| WO | 0157758 | 8/2001 |
| WO | 0186378 | 11/2001 |
| WO | 0193161 | 12/2001 |
| WO | 0205116 | 1/2002 |
| WO | 02/14985 | 2/2002 |
| WO | 0214985 | 2/2002 |
| WO | 02/19229 | 3/2002 |
| WO | 0219229 | 3/2002 |
| WO | 0242970 | 5/2002 |
| WO | 02071187 | 9/2002 |
| WO | 03025695 | 3/2003 |
| WO | 03081376 | 10/2003 |
| WO | 2005001631 | 1/2005 |
| WO | 2005031513 | 4/2005 |
| WO | 2005076181 | 8/2005 |
| WO | 2006028739 | 3/2006 |
| WO | 2006126205 | 11/2006 |
| WO | 2007131258 | 11/2007 |
| WO | 2007136221 | 11/2007 |
| WO | 2008/013945 | 1/2008 |
| WO | 2008013945 | 1/2008 |
| WO | 2008023912 | 2/2008 |
| WO | 2008028154 | 3/2008 |
| WO | 2008052073 | 5/2008 |
| WO | 2008055217 | 5/2008 |
| WO | 2008064343 | 5/2008 |
| WO | 2008067543 | 6/2008 |

(56) References Cited

FOREIGN PATENT DOCUMENTS

| WO | 2008121286 | 10/2008 |
|---|---|---|
| WO | 2008/144643 | 11/2008 |
| WO | 2008144643 | 11/2008 |
| WO | 2010141270 | 12/2010 |
| WO | 2011017613 | 2/2011 |

OTHER PUBLICATIONS

"Google ad words Tacking Codes" Measuring Your Profits, AdWords Help, Google Corporation, Book excerpt pp. 1-2. Available: http://support.google.com/adwords/bin/answer.py?hl=en&answer=2404207&from=146309&rd=1.
"Loyalty Solutions—Issuing Rewards Services" 2008, First Data Corporation. Available at http://www.firstdata.com/downloads/marketing-fs/fd_issuingrewards_ss.pdf.
Carini, Robert, "Oracle's Complete Sell-Side E-Commerce Solution," Apr. 30, 2008, 20 pages, available at http://www.oracle.com/us/products/applications/siebel/self-service-ebilling/038547.pdf.
Georgiadis, Margo et al., "Smart data, smart decisions, smart profits: the retailer's advantage," 22 pages, Feb. 8, 2005. Available at http://web.archive.org/web/20050208141921/http://www.mckinsey.com/practices/retail/knowledge/articles/smartdatasmartdecisions.pdf.
Cashmore, Pete, "YouTube Ads: You Hate Em," available at http://mashable.com/2009/04/05/youtube-ads-youhate-em/#, Apr. 5, 2009.
International Patent Application PCT/US09/52766, International Search Report and Written Opinion, Mar. 11, 2010.
International Patent Application PCT/US2010/036076, International Search Report & Written Opinion, Dec. 30, 2010.
International Patent Application PCT/US2010/043440, International Search Report and Written Opinion, Feb. 24, 2011.
International Patent Application PCT/US2010/044449, International Search Report and Written Opinion, Mar. 14, 2011.
International Patent Application PCT/US2010/044459, International Search Report and Written Opinion, Mar. 28, 2011.
International Patent Application PCT/US2010/044706, International Search Report and Written Opinion, Mar. 25, 2011.
International Patent Application PCT/US2010/044779, International Search Report and Written Opinion, Mar. 31, 2011.
International Patent Application PCT/US2010/044786, International Seach Report and Written Opinion, Mar. 17, 2011.
International Patent Application PCT/US2010/045082, International Search Report and Written Opinion, Feb. 28, 2011.
International Patent Application PCT/US2010/050504, International Seach Report and Written Opinion, Apr. 21, 2011.
International Patent Application PCT/US2010/050923, International Seach Report and Written Opinion, Apr. 26, 2011.
International Patent Application PCT/US2010/051262, International Seach Report and Written Opinion, May 30, 2011.
International Patent Application PCT/US2010/051490, International Seach Report and Written Opinion, Apr. 21, 2011.
International Patent Application PCT/US2010/051853, International Seach Report and Written Opinion, Jun. 21, 2011.
International Patent Application PCT/US2010/052070, International Search Report and Written Opinion, May 31, 2011.
International Patent Application PCT/US2010/053061, International Search Report and Written Opinion, May 30, 2011.
Li, Wen-Syan, "Knowledge Gathering and Matching in Heterogeneous Databases," Working Notes of the AAAI Spring Symposium on Information Gathering, pp. 116-1216, Mar. 27, 1995.
Mielikäinen, Taneli, "Privacy Problems with Anonymized Transaction Databases," 7th International Conference on Discovery Science, pp. 219-229, Oct. 2, 2004.
Punj, Girish et al. "Cluster Analysis in Marketing Research: Review and Suggestions for Application," Journal of Marketing Research, vol. 20, pp. 134-148, May 1983.
Van Grove, Jennifer, "Are Your Online Video Ads Driving Actual Offline Purchases?", available at http://mashable.com/2009/05/18/video-impact/#, May 18, 2009.
International Patent Application PCT/US12/22417, International Search Report and Written Opinion, Aug. 9, 2012.
International Patent Application PCT/US2012/031171, International Search Report and Written Opinion, Oct. 12, 2012.

\* cited by examiner

US 8,626,705 B2

TRANSACTION AGGREGATOR FOR CLOSED PROCESSING

CROSS-REFERENCES TO RELATED APPLICATIONS

This Application claims priority to U.S. Provisional Patent Application No. 61/258,462 filed on Nov. 5, 2009. This provisional application is herein incorporated by reference in its entirety for all purposes.

BACKGROUND

To increase sales, merchants and service providers use a variety of styles and channels for advertising to potential customers. The decision whether to spend the money on advertising is often not the major question. Rather, merchants need to decide how their advertising money will be most effective in reaching receptive and purchase prone segments of the population. It therefore makes sense that a merchant or other advertiser would want to spend their advertising dollars in the most effective manner possible. This means that they will need to target their advertising efforts at those consumers who are most likely to make a purchase in response to receiving or viewing an advertisement. This type of advertising is known as target marketing.

Traditional target marketing relies on consumer surveys and tracking spending patterns for online and brick-and-mortar sales on a merchant-by-merchant basis. Although such targeting can be somewhat helpful, there are major deficiencies in this type of target marketing. For example, the consumer surveys are often self-selecting in that only certain types of consumer are likely to respond to print, telephone or in-person consumer surveys. These types of consumers can fall into many categories, but tend to be self-sort based on the type of survey that is being conducted.

Print surveys, like the type included on a self-addressed postage-paid postcard along with a purchased product, require that a consumer take the time to fill-in the survey and then send it back. Such surveys automatically exclude busy, lazy and/or indifferent consumers and target only certain personality types that will take the time necessary to respond. Similarly, consumers are sometimes asked to visit a website printed on a paper or online/email receipt after completing a purchase to participate in a survey. Such tactics can have similar results in only capturing a small portion of potential consumers.

To improve the response rate of print or online consumer surveys, some merchants and advertiser have taken to offering incentives likes rebates, discounts and special offers to consumers who respond to the survey. However, these programs can skew consumer responses if the consumer thinks his or her response will have an impact on the size or amount of the promised incentive. Furthermore, incentive programs often result in capturing responses from only extremely cost sensitive consumers and exclude the most valuable type of consumers who are likely to pay full retail prices.

On the other end of the spectrum of consumer surveys are person-to-person surveys, such as telephone and in-person surveys, in which an interviewer asks a consumer to respond to a set of questions. These types of surveys are even more effective in polarizing consumers. Consumers who are likely to respond person-to-person surveys are a very small subset of all potential consumers. Most consumers simply do not have the time or interest to participate in person-to-person surveys and some are in fact very annoyed by such intrusions on their time. As such, most types of consumer surveys have significant limitations on how well they can provide information for targeted marketing based on the likelihood that only limited portions of the potential consumer population will respond, and do so accurately.

To get the best information as to the interests and propensity for spending, some online advertisers have taken to detecting key words and phrases in consumers' browser-based email activity and web browsing to determine what consumers in a particular areas determined by IP addresses might find appealing and likely to purchase. Although such techniques are more passive, in that consumers do not have to enter actively any information in addition to the information they are already entering to perform intended functions or complete other online tasks, the feedback loop on the effectiveness of such advertising is still rather limited.

Although key-word and IP address based advertising can track the click-through rate of consumers who are selectively chosen to be shown a particular advertisement, that information can really only be used to determine the effectiveness of the algorithms used to determine which consumers should be shown a particular advertisement and not the effectiveness of the advertisement in obtaining a sale or potential for a particular sale based on past or trending purchasing behavior on a population on the consumer level.

Some advertiser rely on the merchants themselves and other data mining operations to track spending and sale patterns of consumers on a merchant-by-merchant basis. While useful, such data is limited in a variety of ways. In scenarios in which spending patterns are determined by looking at a merchant's own customers' spending, that information is really only useful for incentivizing existing customers to spend more and not particularly helpful in finding new customers. Data mining of particular market segments looking for potential new customer information has similar limitations. Most merchants will want to protect their customers' information from being used by competitors to lure customers away. Because of the competitive nature of most markets, data reported by most merchants tends to be scrubbed of any useful information that could possibility be used to measure the effectiveness of a particular advertising campaign or promotional program in obtaining new customers.

Advertisers, publishers and merchants need new, accurate and cost-effective ways to target and track the effectiveness of print and online advertising. Embodiments of the present invention address this and other needs.

BRIEF SUMMARY

Embodiments of the present invention are directed towards systems and methods for providing transaction level data aggregates to advertisers, publishers and merchants regarding the spending patterns and behaviors of various groups identified or associated with a group characteristic. The group characteristic can be based on any number of data associated with user accounts. For example, one embodiment the present invention can determine transaction level data aggregates for accounts associated with a population of users who live in a specific zip code.

Other embodiments of the present invention are directed toward transaction aggregators and systems for deriving aggregated transaction level data having a server computer comprising (a) a processor; and (b) a computer readable medium coupled to the processor. The computer readable medium can include code for causing the processor to implement a method for deriving aggregated transaction level data by sending a transaction data inquiry file from an aggregator server to a transaction database and in return, receiving a transaction data response file from the transaction database. The transaction aggregator can then parse the transaction data response file according to the transaction level inquiry file and determine a first transaction level data aggregate from the parsed transaction data response file. The first transaction aggregate is based on a first group characteristic.

In yet other embodiments, the transaction aggregates can be based on group characteristics such as demographic information, address, zip code and consumer type. Furthermore, the transaction aggregates can be specified by group characteristics that are correlated to IP addresses.

DETAILED DESCRIPTION

Embodiments of the present invention are directed towards systems and methods for gathering and aggregating transaction level data regarding user accounts associated with specific group characteristics. Such embodiments can include a transaction aggregator within a computer network or a payment processing network to manage, process and deliver customized or standardized descriptive transaction level data aggregates to entities such as publishers, advertisers and merchants. The transaction level data aggregates can be used by the entities to plan, focus and measure the effectiveness of targeted advertising.

Figure 1:
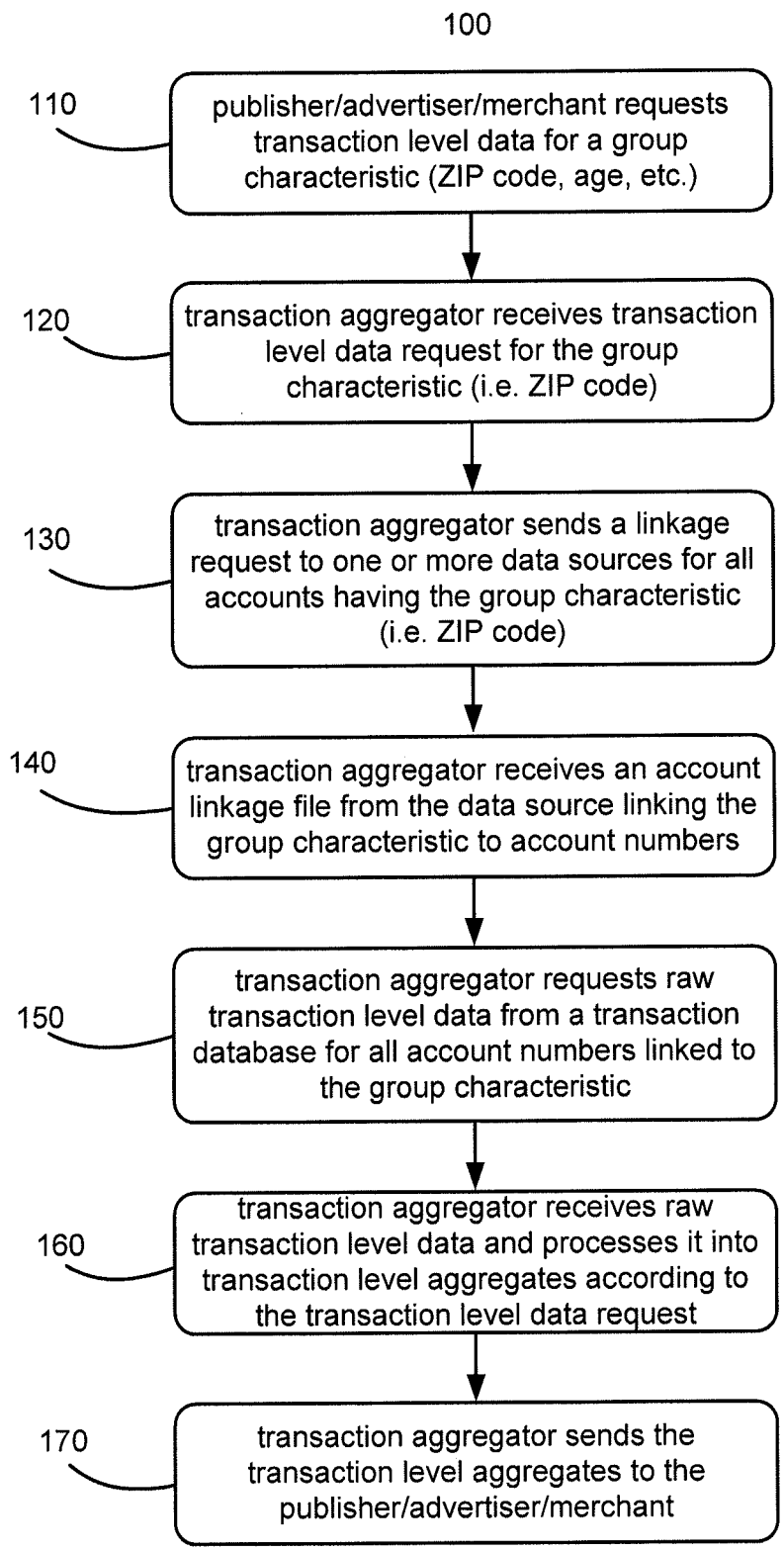
FIG. 1 is a flow chart of a method for providing transaction level data for accounts associated with specific group characteristics.

FIG. 1 is a flow chart of a method 100 for providing transaction level data aggregates for user accounts associated with a specific group characteristic according to one embodiment of the present invention. User accounts can include payment accounts such as credit card, debit card and other financial and payment accounts. User account can also include online user accounts that can be used for conducting various financial, payment and information transactions, like PayPal™, Google Checkout™ and email accounts. In some embodiments, the identities of the users associated with the user accounts associated with a specific group characteristic can be withheld from any of the entities involved with the following steps.

Method 100 begins at step 110 in which a publisher, an advertiser, merchant or other requesting entity can send an inquiry for transaction level data for a desired group characteristic. Such inquiries can be in the form of a transaction level aggregate request file. For example, a merchant, either a traditional brick-and-mortar or an online merchant, can request transaction level data, using a transaction level aggregate request file, for all credit card accounts with a home address listed in a specific zip code. The desired zip code could represent the zip or zip codes surrounding a particular store location. The requested transaction level data for the credit card accounts can be as general or specific as the merchant would like. For example, the merchant may ask for the total amount spent using credit card accounts having billing addresses in the zip codes surrounding the merchant's outlets for specific periods. The periods can reflect times before, during or after the launch of an advertisement or offer to consumers residing in the zip codes. Using such information, a requesting entity can specifically target the advertisement or offer and subsequently evaluate the effectiveness of the advertisement or offer. This of course, is but one example of the information about which a requesting entity can inquire. The scope, depth and detail of the transaction level data for one or more separate or overlapping group characteristics can vary according to the needs of the requesting entity.

In step 120, a transaction aggregator can receive a transaction data inquiry for a specific group characteristic. The transaction data inquiry can include a request for information concerning the identities of the user account holders associated with the specific group characteristic. In other embodiments, the transaction data inquiry can request that the transaction data be returned without, and thus hiding, the identities of the users associated with the user accounts having the specific group characteristic. A description of the transaction aggregator and various uses thereof can be found in U.S. patent application Ser. No. 12/616,048, filed on Dec. 18, 2009, and is herein incorporated by reference. In some embodiments, the transaction aggregator can receive the transaction data inquiry in a transaction data inquiry file over existing electronic communication media or networks, such as a payment-processing network used in processing credit card transactions and payments. The transaction aggregator can also receive the transaction data inquiry file via other data or financial networks such as the Internet or proprietary banking networks.

Once the transaction aggregator receives the transaction data inquiry file from the requesting entity at step 120, it can parse out the specifics of the transaction data inquiry and send a linkage request file to one or more data sources in step 130. The linkage request file can include a request for all user accounts associated with a specific group characteristic specified in the transaction data inquiry file. In some embodiments, the linkage request file can include a request for the identities of the users associated with user accounts associated with a specific group characteristic specified in the transaction data inquiry file. In other embodiments, the linkage request file can include a request to omit the identities of the users associated with user accounts associated with a specific group characteristic specified in the transaction data inquiry file. In this way, the transaction aggregator can chose to maintain the anonymity of individual users associated with the user accounts determined to have a specific group characteristic.

The linkage request file sent to the data sources can include a template inquiry file or format containing specific information parsed from the transaction data inquiry file received from the requesting entities. For example, a linkage request file can include an entry specifying a specific zip code or set of zip codes, an entry specifying the type of credit card accounts and an entry specifying a particular time period of interest. Such a linkage request file can specify credit accounts associated with zip code 94061, having a limit greater than $7000 and that have been used in the last 5 months. The linkage request file can be sent from the transaction aggregator in a format native to the transaction aggregator or in a format specified by the particular data source, i.e. a credit reporting bureau.

In response to the linkage request file, the transaction aggregator can receive an linkage response file from the data source linking all the accounts to one or more of the specific pieces of information included in the linkage request file in step 140. For example, the linkage response file can include a listing of all accounts having a billing address associated, with a specific zip code or range of addresses in a particular city or county. The linkage response file can include a listing of identifiers, such as a social security number or a name, linked to the accounts associated with the specified information.

In step 150, the transaction aggregator can use the linkage response file to request transaction level data from a transaction database for all or some the account numbers linked to or associated with the group characteristic. The request sent from the transaction aggregator can be in the form of a transaction data request file. In some embodiments, the scope, depth and details of the transaction level data can vary according to the transaction data inquiry file or the transaction data request file. For example, the transaction data request file can specify specific dates of transactions. The transaction data request file can also specify information including, but not limited to, the amount of the transactions, location of the transactions, merchant identifier or type, date of the transaction and any other transaction specific data stored by the transaction database, such as the identity of the users associated with each transaction. However, the identities of the users associated with each transaction can also be omitted to protect the privacy of and provide anonymity for the users.

In step 160, the transaction aggregator can receive transaction level data from the transaction database in a transaction data response file and parse and process the transaction response file into transaction level data aggregates according to the transaction data inquiry and other rules and protocols. The transaction data response file can include information regarding multiple accounts for multiple users associated with multiple group characteristics. The transaction data response file can include or omit the identities of the users associated with the accounts associated with the group characteristic. In some embodiments, the processing performed by the transaction aggregator can include vast amounts of data included in the transaction level data. As such, it can be desirable, in some embodiments, for the transaction aggregator to be able to distribute the processing among multiple processors, memories and data stores according to various distributed computing methods known in the art. For example, the processing of such vast quantities of data can be performed using various cloud-computing techniques offered by cloud-computing services.

Once the transaction aggregator has completed determining the transaction aggregates, also referred to as transaction level data aggregates, in step 160, it can send the transaction aggregates to the requesting entity, via one or more of the electronic communication media or networks mentioned above, in step 170. As used herein, the terms transaction level data aggregates and transaction aggregates can be used interchangeably to refer to any processed results using transaction level data and in response to a transaction data inquiry. The aggregates can be associated with one or more user identities associated with the user accounts included in some or all of the transaction level aggregates. As such, the transaction aggregator can be configured to either provide the identities of the users associated with data in the transaction aggregates for marketing purposes or other purposes. In other embodiments, the identities of the users associated with user accounts having transactions included in a particular transaction aggregate can be omitted to protect the privacy of the users. In some embodiments, use of existing communication media is desirable to facilitate cost effective and easy adoption of methods and systems according to various embodiments of the present invention.

Figure 2:
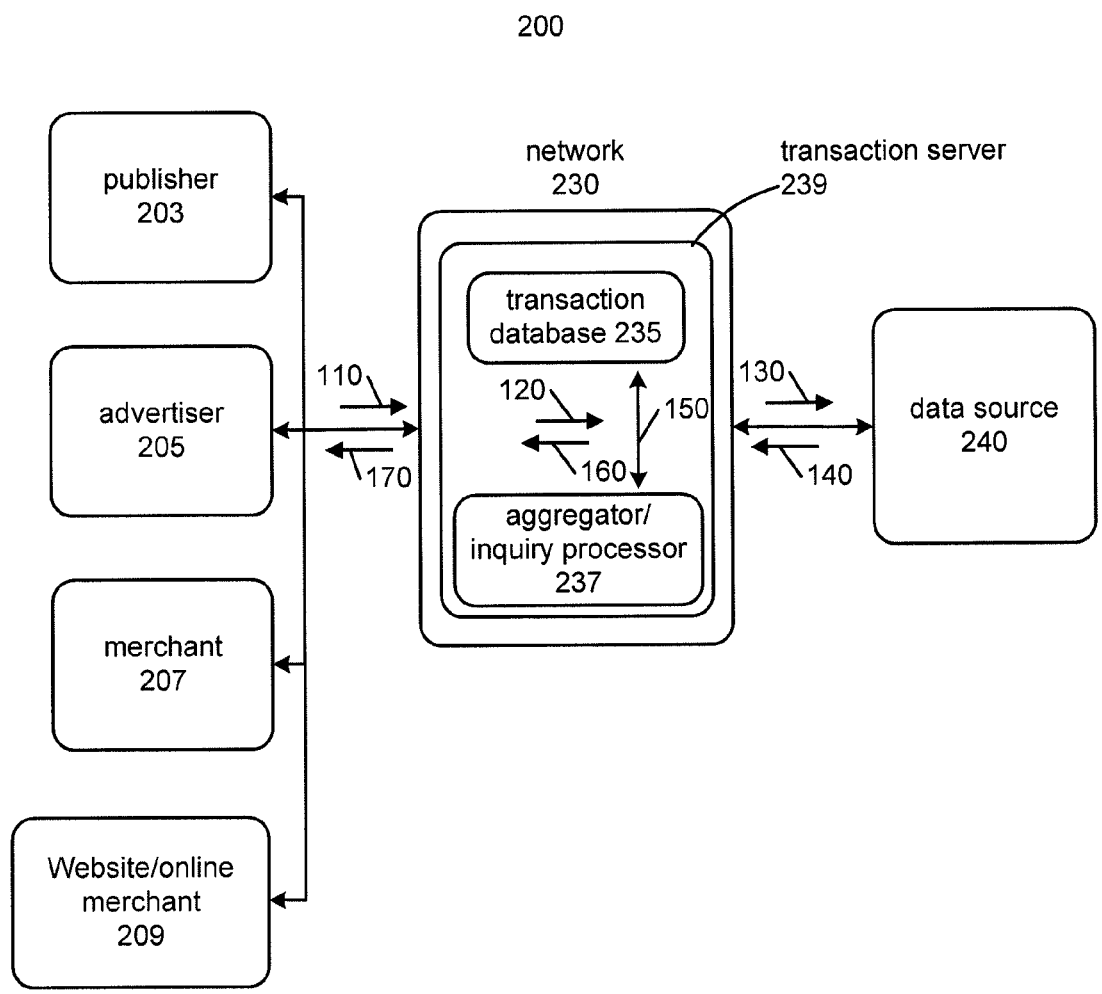
FIG. 2 is a schematic of a system for providing transaction level data for accounts associated with specific group characteristics.

FIG. 2 is a schematic of a system 200 that can be used to provide transaction aggregates to one or more requesting entities according to various embodiments of the present invention. The system 200 can include a number of requesting entities such as publisher 203, advertiser 205, merchant 207 and websites/online merchants 209. The requesting entities can each operate a computer apparatus comprising a processor and communicate with network 230 over one or more electronic communication media such as a payment processing network, the Internet or other wired or wireless networks.

Network 230 can be a credit card payment processing network. The network 230 can include transaction server 239. Transaction server 239 can include transaction database 235 and a transaction aggregator/inquiry processor 237. Transaction database 235 can include transaction level data such as detailed information regarding individual credit card transactions. In some embodiments, transaction database 235 can be a network of data stores that serves one or more credit card processing networks or associations. Aggregator/inquiry processor 237 can be one or more computers or server computers. Aggregator/inquiry processor 237 can communicate with transaction database 235 over one or more wired or wireless electronic communication media.

In some embodiments, network 230, transaction server 239 or aggregator/inquiry processor 237 can communicate with external or internal data source 240 over one or more electronic communication media suitable for transmitting data quickly and reliably. In some embodiments, the data source 240 can be a credit reporting bureau. Data source 240 can store and report on information regarding user accounts and any information associated with user accounts. For example, data source 240 can store information associated with a consumer credit card account such as home address including a zip code, Social Security number, classification of consumer, classification of user account, aging history and other information. The numbered arrows pictured in FIG. 2 correspond to the data flow of the numbered steps of the method shown in the flowchart of FIG. 1.

In various embodiments, any of the foregoing described entities or components of system 200 can be configured to remove the identities of users associated with the transaction level data included in the transaction aggregates to protect the identities and privacy of the users. In other embodiments, any and all of the foregoing described entities or components of system 200 can be configured to include the identities of the users associated with the transaction level data included in the transaction aggregates for various marketing, tracking and other purposes.

Figure 3:
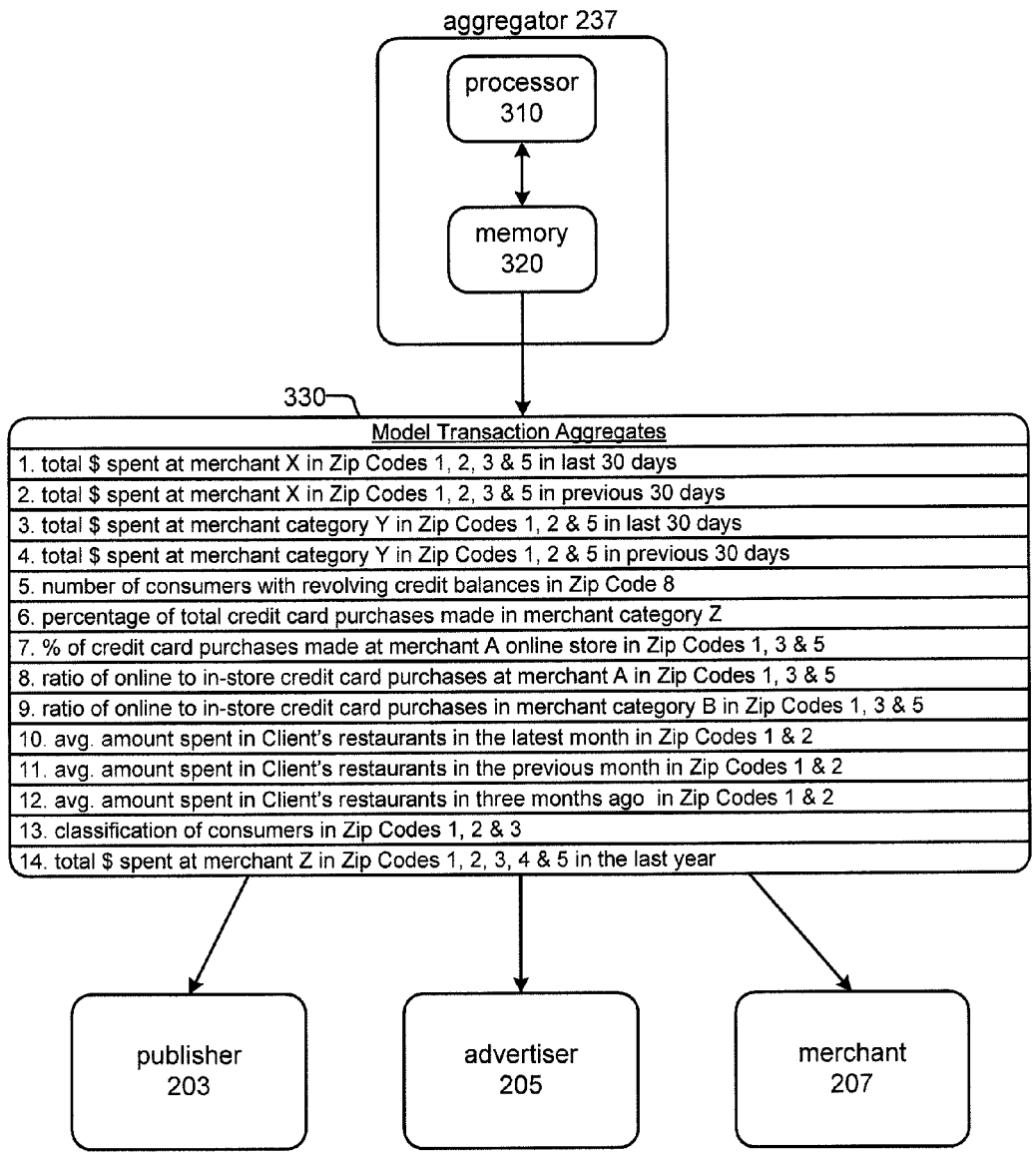
FIG. 3 is a schematic of a system for storing and retrieving model transaction aggregates having an example of model transaction aggregates.

FIG. 3 shows a schematic of a system for providing model transaction aggregates to one or more entities or data requesters. In the example shown, aggregator 237, having a processor 310 and a memory 320, can store model transaction aggregates 330. Once an entity, such as publisher 203, advertiser 205 or merchant 207 chooses to participate, order or enroll in any transaction level aggregates providing system, aggregator 237 can use its processor 300 to retrieve model transaction aggregates 330 from memory 320 and send the model transaction aggregates 330 to one or more of the entities. In some embodiments, aggregator 237 can send the model transaction aggregates 330 to publisher 203, advertiser 205 or merchant 207 over any suitable communication medium, such as the Internet, a payment processing network, a banking network or other financial transaction or data network.

Model transaction aggregates 330 can include any number of recommended or suggested model transaction aggregates that the aggregator 237 or network 230 has determined might be useful to one or more of the entities including, but not limited to, publisher 203, advertiser 205 or merchant 207. The model transaction aggregates 330 shown in FIG. 3 are merely illustrative and should not be considered limiting.

In some embodiments, the model transaction aggregates 330 can be customized for use by one of the entities. In such embodiments, the model transaction aggregates 330 can be used as templates in which the requesting entities can specify certain values, such as time-periods and threshold values, they might find useful for their own internal targeted marketing programs and analysis. In other embodiments, model transaction aggregates 330 can be fixed, in such scenarios, any participating entities would only have to simply choose from a menu of model transaction aggregates they might wish to receive. In other embodiments, the model transaction aggregates can be fixed except for one or more key group characteristics.

For example, as shown in model transaction aggregates 330 model transaction aggregate number 1 specifies an aggregate equaling the total dollar amount spent at merchant X in zip codes 1, 2, 3 and 5 in the last 30 days. In some embodiments, the value for merchant X can be substituted with an actual merchant name or identifier and the zip codes specified can be replaced with zip codes of interest for the named merchant.

The replacement of various placeholder values in the model transaction aggregates 330 can occur at various levels of detail depending on the needs and practices of the requesting entity. For example, advertiser 205 may be an online advertiser who is partnered with an online search engine with keyword-trigger advertising that can detect various keywords in users' web-based e-mail or web browsing behavior. In such programs, advertiser 205 can specify to the online search engine which keywords coming from a specific set of IP addresses, should trigger the display of one or more advertisements specified by advertiser 205. The IP addresses can be defined by a geographic region that can be referenced by a range of addresses or ZIP codes. Specifically, advertiser 205, who may be engaged in an advertising campaign for camping equipment, can specify that one of five predetermined camping equipment advertisements should be displayed to any users who read or send e-mail using a browser-based Web e-mail program using the words "camping" or "kayaking" for any and all online traffic generated from a specific range of IP addresses associated or related to zip codes 94114, 94111, 94110 and 94119. The use of zip codes to identify a specific range of IP addresses is only one example of how such keyword-trigger advertising can be directed at specific group characteristics. Any designation of geographic area or other group characteristic can be used to specify a specific set or range of IP addresses for the targeted online marketing. The advertising campaign can go on indefinitely or for some predetermined amount of time depending on the goals of advertiser 205.

At any point before, during or after a particular advertising or marketing campaign, such as the keyword-trigger, IP address specific advertising campaign described above, publisher 203, advertiser 205 or merchant 207 can request various transaction level aggregates from aggregator 237 to test the potential, progress or effectiveness of the campaign. For example, prior to sending out a paper-based mailer or marketing campaign to a specific set of potential consumers defined by one or more specific or general group characteristics, like home address, zip code and age, the requesting entity might like to know the total dollar amount spent at a specific merchant type by consumers in that age group residing in the zip codes of interest. If the requesting entity discovers that the spending trend among consumers in the age group and zip codes of interest, such as 35 to 40-year-olds in the San Francisco Bay Area, in the specified merchant type, such as furniture stores, has been increasing, then it may be effective to send a mailer along with a coupon to the 35 to 40-year-olds within a certain radius of their furniture store. The spending trend information can be obtained using one or more predefined or requesting entity customized transaction level aggregates. Such aggregates give requesting entities more insight into the potential buying behavior and past spending habits using fewer resources and time than used to be required using consumer surveys and merchant-by-merchant sales trending. Additionally, providing transaction level data aggregates according to various embodiments of the present invention allows for real time, or near to real time, analysis of progress of a particular advertisement or promotional campaign. Not only is the information provided in the transaction aggregates in various embodiments of the present invention more timely than previously possible, it can also provide much more specific and targeted data with more meaningful and useful metrics at costs far less than any other type of data mining currently available.

Figure 4:
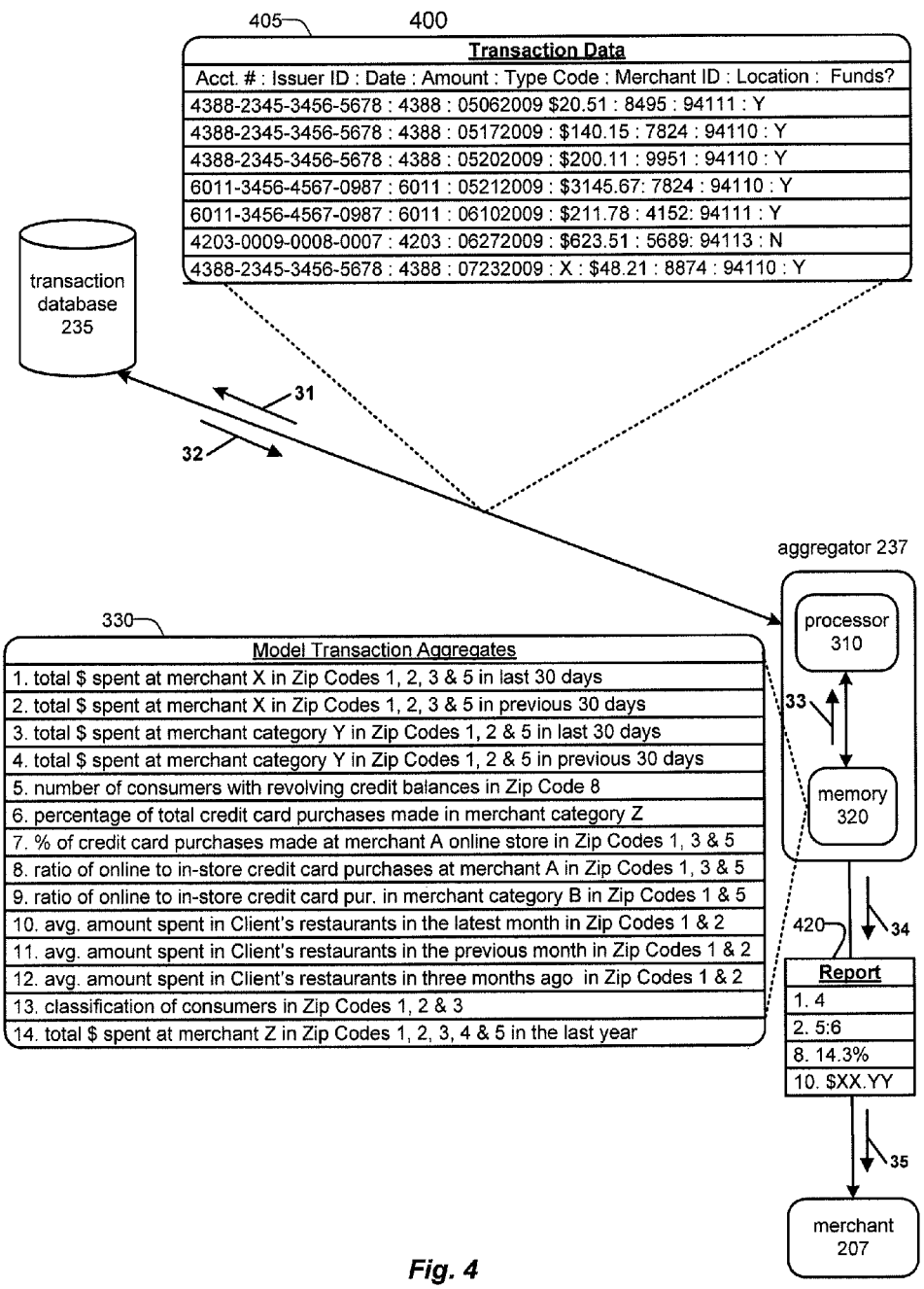
FIG. 4 is a schematic of a system for storing and retrieving model transaction aggregates and transaction level data with examples.

FIG. 4 is a schematic of a system 400, showing the associated data flow, for generating and reporting various types of transaction level aggregates based on group characteristics. After aggregator 237 receives a transaction data inquiry file from the requesting entity, such as merchant 207, it can parse out the specifics of the transaction data inquiry and send a linkage request file to one or more data sources to obtain all accounts associated with the specific group characteristics specified in the transaction data inquiry file. A linkage response file can then be sent back to aggregator 237.

The data flow shown within system 400 begins when aggregator 237 receives the linkage response file from one or more data sources. Using the linkage response file, aggregator 237 can create a transaction data request file. Aggregator 237 can then send the transaction data request file to transaction database 235 in step 31. Transaction database 235 can be any type of transaction database and can also be part of a transaction processing network, such as a credit card payment processing network or other financial transaction processing network. Transaction database 235 can then parse the transaction data request file to determine for which accounts it should retrieve transaction data. The transaction data can include any information associated with an individual transaction identified or associated with an account or account identifier. As shown, transaction data 405 can include individual records including data such as an account number, an issuer identifier, the date of the transaction, the amount of the transaction, the type of the transaction, a merchant identifier, the location of the transaction and whether not the funds were available for the transaction indicating whether or not the transaction was completed or not. The type of information available for each transaction record can vary depending on the transaction database 235 and the type of information reported can vary depending on the requested information specified in the transaction data inquiry file. Transaction database 235 can then compile the transaction data 405 into a transaction data response file and send it back to aggregator 237 in step 32.

At some time before or after aggregator 237 receives the transaction data response file, it can then retrieve from memory 320 one or more transaction aggregate specifications or templates in step 33. The transaction aggregate specifications or templates retrieved from memory 320 can be requesting entity-defined or selected from a set of model transaction aggregates 330 discussed in reference to previously discussed FIG. 3. In the case in which the desired resulting transaction aggregates are pulled from a set of model transaction aggregates 330, aggregator 237 can reference particular model transaction aggregates by a model transaction aggregate identifier or number. In such cases, the requesting entity can simply request that an aggregator 237 return transaction aggregates specified by transaction aggregate identifier or number for the particular group characteristics of interest. In this way, the requesting entity, such as merchant 207, can choose transaction aggregates from a menu of model transaction aggregates 330, thus limiting the amount of data that needs to be sent between the transaction aggregator 237 and transaction database 235.

Aggregator 237 can use one or more processors 310 to read the particular transaction aggregates or transaction aggregate templates of interest and process the transaction data response file to compile the requested transaction aggregates. Once the transaction aggregates are compiled, aggregator 237 can create a report 420 compiling all or some of the requested transaction aggregates in step 34. Report 420 can then be sent to merchant 207 or any other requesting entity in step 35. The report 420 can be sent over any suitable electronic communication medium capable of quickly and reliably transmitting large amounts of data. Alternatively, the report 420 can be sent using traditional paper based messaging services such a traditional postal service.

Figure 5:
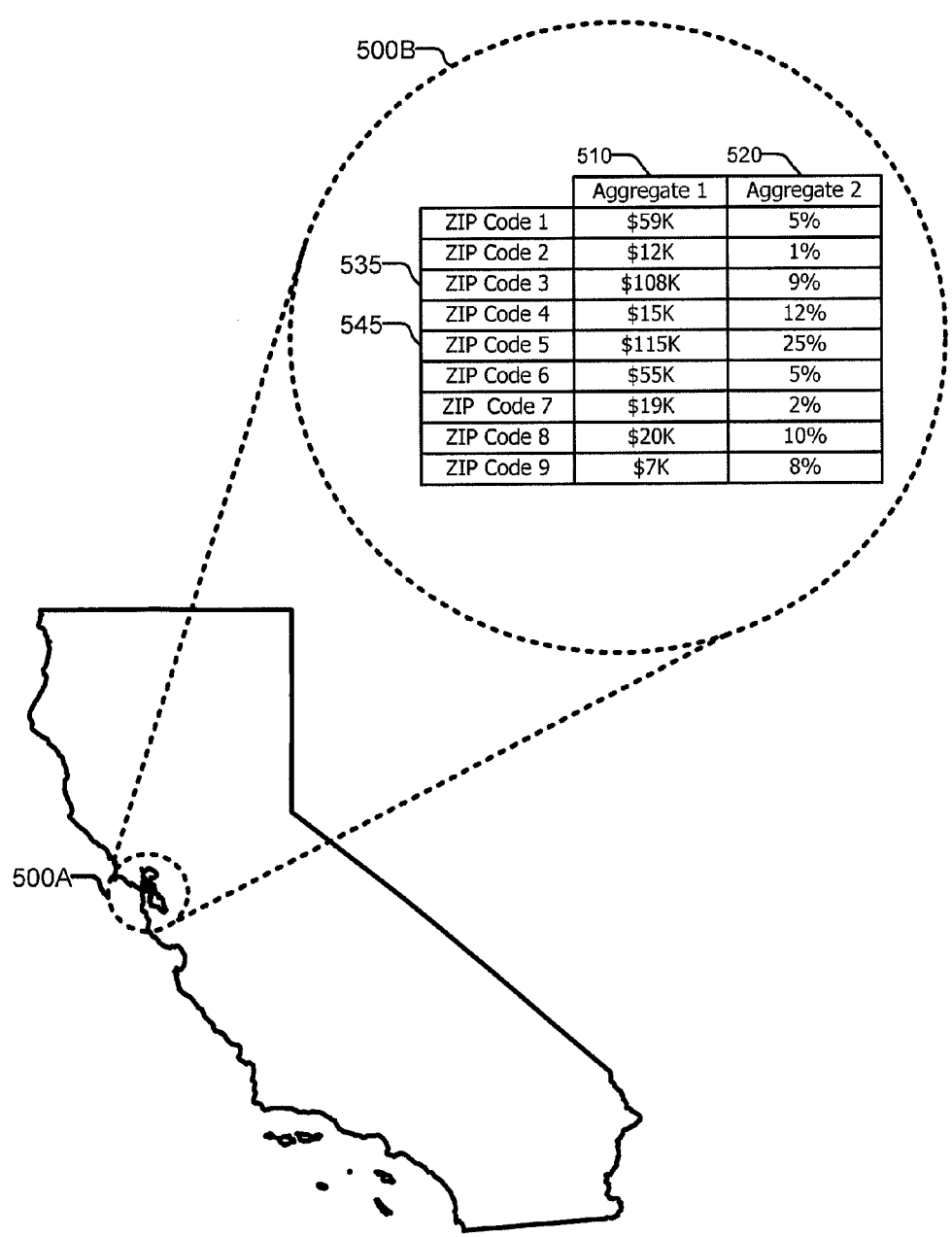
FIG. 5 shows a sample of the transaction aggregates for various regions defined by ZIP code.

FIG. 5 shows a sample of the correlation between a geographic area and the transaction level aggregates for each of a number of zip codes or zip code ranges. For example, a merchant or advertiser may want to know how much money consumers in a particular group of zip codes is spending at a particular store or store type before or after a particular advertising or marketing campaign. Embodiments of the present invention can be used to produce those aggregates based on real transaction level data. Going back to the advertiser that is about to run a mailer-based promotion in the area around a camping supply store A, getting information about the camping supply spending habits of the consumers in a particular geographic area surrounding camping supply store A can help the advertiser decide which zip codes of consumers should be targeted with the mailer campaign. The table of transaction aggregates for specified zip codes shown in 500B can be compiled for the credit card users having a billing address within the geographic area 500A. In this scenario, billing addresses within the geographic area 500A represents the particular group characteristic of interest. This group characteristic can be used on its own or combined with other group characteristics such as age, annual income for any other piece of information that a transaction database can associate with a particular transaction based on the user account used in the transactions.

Assuming that the transaction aggregate 1 510 represents the total amount spent by the consumers with credit card billing addresses in the specified zip code at camping supply type stores in the last seven days and aggregate 2 520 is the percentage of all credit card transactions in that same specified zip code that aggregate 1 510 represents, then the advertiser might want to concentrate on zip code 5 shown on line 545 to get a larger share of that potential market of camping supply expenditures for camping supply store A. On the other hand, the advertiser may want to target zip code 3 shown on line 535, since it has large dollar amount of camping supply type purchases but makes up a lower percentage of the total credit card purchases, indicating there are more potential sales to be captured in that zip code. The manner in which the advertiser orders and uses aggregate 1 510 and aggregate 2 520 and other transaction aggregates can depend on objective and/or goals of the advertiser.

In other embodiments, an advertiser might like to measure progress of an ongoing promotion or the effectiveness of a completed marketing campaign, such as the mailer campaign described above, by ordering periodic or final transaction aggregates to use in trending studies or comparisons with past aggregates. For example the transaction aggregates in 500B might be ordered seven days after it is determined that the mailer promotion has been delivered to the majority of consumers in the target zip codes. Information shown in the transaction aggregates can then be compared to transaction aggregates ordered prior to the beginning of the mailer campaign. This information can be used to measure the effectiveness of the mailer campaign and possibly further refine future mailer campaigns sent to zip codes covered by the transaction aggregates in 500B. To refine future advertising or marketing campaigns or to measure the effectiveness of past advertising or marketing campaigns, information requesters such as advertisers, publishers and merchants, can design transaction aggregates with combined group characteristics to analyze the spending behavior of consumers associated with those group characteristics.

Figure 6:
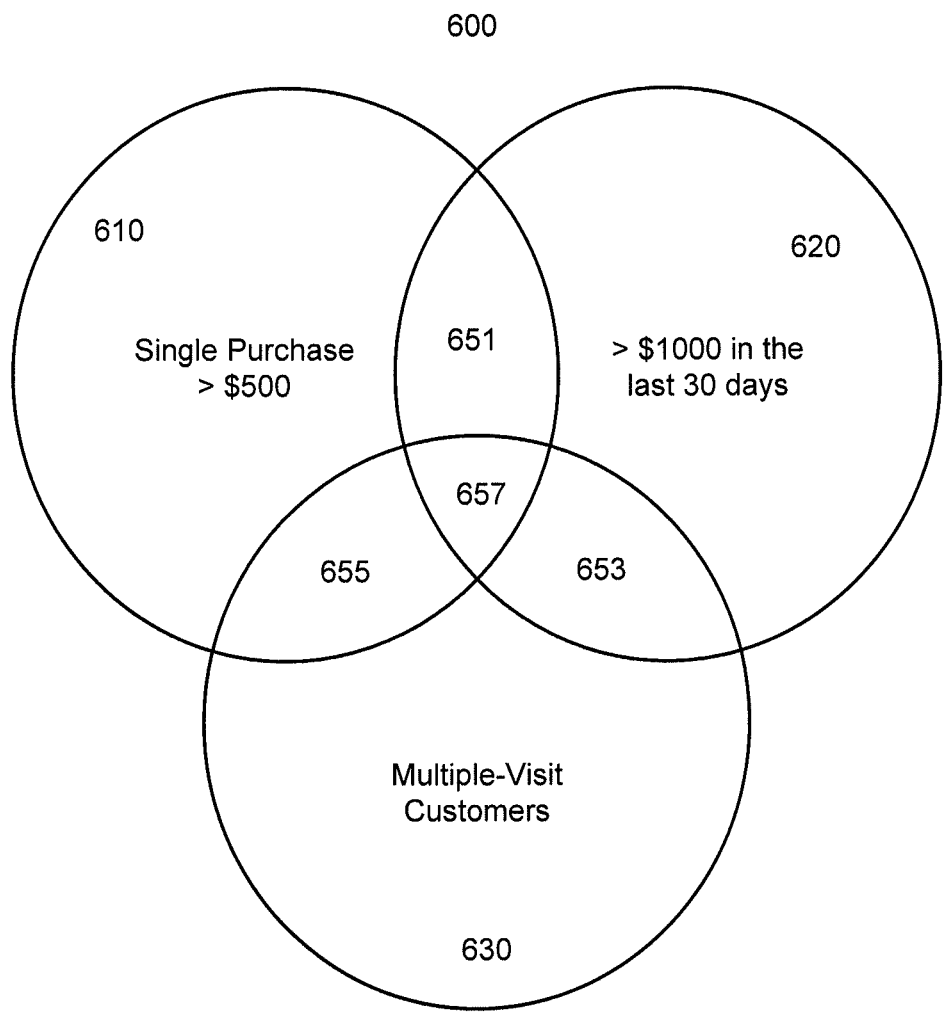
FIG. 6 shows a Venn diagram of a sample set of transaction level aggregates according various embodiments of the present invention.
Figure 7:
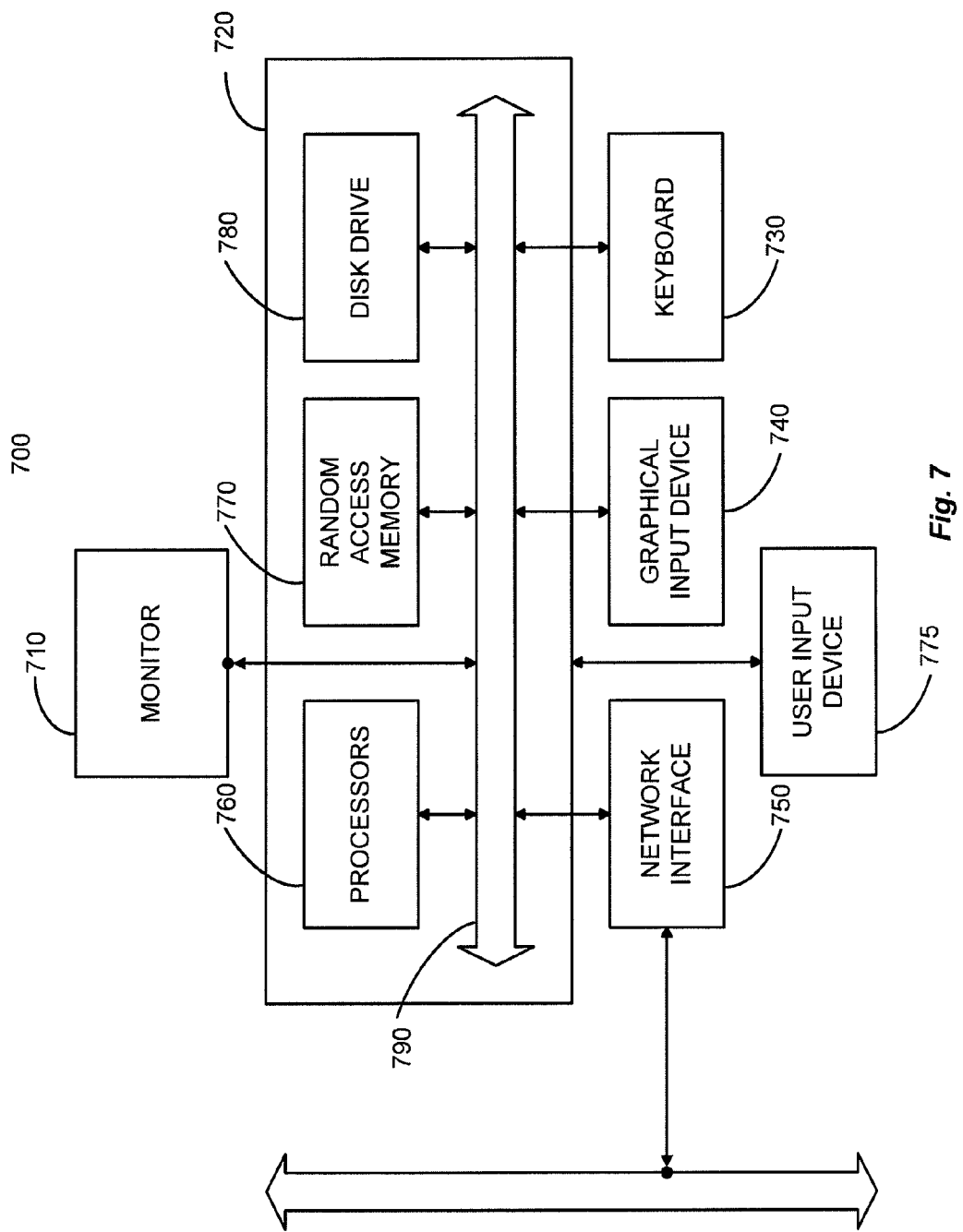
FIG. 7 is a schematic of a computer system that can be used to implement various embodiments of the present invention.

FIG. 6 shows a Venn diagram 600 that can be designed to reveal probable or past spending behavior of various groups of consumers that fall within one or more of the categories 610, 620 and 630. The Venn diagram 600 is only one example of possible group characteristic analysis using transaction level aggregates provided by various embodiments of the present invention that an information requesting entity might find useful.

As shown, Venn diagram 600 includes three main categories: the number of consumers having a various group characteristics who made a single purchase greater than $500 at a particular merchant's outlet is represented by circle 610; the number of consumers having various group characteristics who spent more than $1000 in the last 30 days at a particular merchant's outlets is represented by circle 620; finally circle 630 represents the number of consumers who visited a particular merchant's outlets multiple times in the last 30 days. As can be seen, various individual consumers might fit into one or more of categories 610, 620 and 630. These overlaps are represented by regions 651, 653, 655 and 657. By analyzing the Venn diagram 600, a merchant can determine that consumers who spent more than $500 a time and spent $1000 more in the last 30 days over multiple visits would be represented by consumers falling within the region 657.

The merchant can then analyze the underlying group characteristics of those consumers within the region 657 to determine a geographic, demographic or other group characteristic to help determine future trends of spending for those consumers. Alternatively, other uses of transaction aggregates provided by various embodiments of the present invention as represented by Venn diagram 600 can also be used to analyze the effectiveness during or after a particular marketing or advertising campaign.

The ability to create transaction aggregates associated with user accounts identified at the group characteristic level allows requesting entities to process the effectiveness of marketing and advertising campaigns based on the completion of actual transactions. Transaction databases can be used to collect transaction level data to determine exactly where transactions are completed by looking at the specifics of each transaction record. This information can then be correlated back to the target group characteristic to determine if there was a sale resulting from the campaign. Thus, if an advertiser is looking to increase sales at a particular merchant, then the advertiser can look at completed transactions at that merchant as they relate to group characteristics of consumers at whom various marketing and advertising campaigns were targeted. Embodiments of the present invention discussed above have the advantage of being able to correlate information identifying specific groups of consumers to specific marketing and advertising campaigns and subsequently being able to analyze the effectiveness of those campaigns based on actual transaction data at the group characteristic level. Again, the group characteristics can include any characteristic of one or more consumers linked to individual transactions in the transaction database. As such, embodiments of the present invention can include group characteristics currently collected at the transaction level and group characteristics that may be added based on their usefulness for future marketing and advertising campaigns.

For example, current transaction level data for credit card or debit card transactions include date, time, location and account number or other identifiers. The account number or other identifier can be used to specifically identify other characteristics of the account holder. For instance, when any accounts are opened, issuers can collect the account holder's date of birth, billing address, sex and other group characteristic and demographic information. Such information can be called upon by various information requesters to identify user accounts and, from that starting point, send a collection of user accounts to transaction database to pull all transactions associated with those user accounts for any given period stored within the transaction database.

System 700 is representative of a computer system capable of embodying the present invention. The computer system can be present in any of the elements in FIG. 2, including the transaction server 239, transaction database 235 and aggregator 237 described above. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™ Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 700 typically includes a display 710, computer 720, a keyboard 730, a user input device 740, computer interfaces 750, and the like. In various embodiments, display (monitor) 710 may be embodied as a CRT display, an LCD display, a plasma display, a direct-projection or rear-projection DLP, a microdisplay, or the like. In various embodiments, display 710 may be used to display user interfaces and rendered images.

In various embodiments, user input device 740 is typically embodied as a computer mouse, a trackball, a track pad, a joystick, wireless remote, drawing tablet, voice command system, and the like. User input device 740 typically allows a user to select objects, icons, text and the like that appear on the display 710 via a command such as a click of a button or the like. An additional specialized user input device 745, such a magnetic stripe, RFID transceiver or smart card reader may also be provided in various embodiments. In other embodiments, user input device 745 include additional computer system displays (e.g. multiple monitors). Further user input device 745 may be implemented as one or more graphical user interfaces on such a display.

Embodiments of computer interfaces 750 typically include an Ethernet card, a modem (telephone, satellite, cable, ISDN), (asynchronous) digital subscriber line (DSL) unit, FireWire interface, USB interface, and the like. For example, computer interfaces 750 may be coupled to a computer network, to a FireWire bus, or the like. In other embodiments, computer interfaces 750 may be physically integrated on the motherboard of computer 720, may be a software program, such as soft DSL, or the like.

RAM 770 and disk drive 780 are examples of computer-readable tangible media configured to store data such user, account and transaction level data, calculated aggregated data, super keys, sub keys and other executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 700 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer 720 typically includes familiar computer components such as a processor 760, and memory storage devices, such as a random access memory (RAM) 770, disk drives 780, and system bus 790 interconnecting the above components.

In some embodiments, computer 720 includes one or more Xeon microprocessors from Intel. Further, in the present embodiment, computer 720 typically includes a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for deriving aggregated transaction data comprising:
   sending, by an aggregator server, a transaction data inquiry file from the aggregator server to a transaction database of a financial transaction processing network;
   receiving, by the aggregator server, a transaction data response file from the transaction database, the transaction data response file comprising financial information;
   parsing, by the aggregator server, the transaction data response file according to the transaction data inquiry file;
   determining, by the aggregator server, a first transaction aggregate from the parsed transaction data response file, wherein the first transaction aggregate indicates a ratio of online to in-store purchases within a geographic region;
   determining, by the aggregator server, a second transaction aggregate from the parsed transaction data response file, wherein the second transaction aggregate indicates a total number of consumers with a revolving balance on a credit card account within the geographic region;
   determining, by the aggregator server, a third transaction aggregate from the parsed transaction data response file, wherein the third transaction aggregate indicates a total spent in a merchant category within a predetermined amount of time within the geographic region; and
   determining, by the aggregator server, a fourth transaction aggregate from the parsed transaction data response file, wherein the fourth transaction aggregate indicates an average amount spent at a merchant within the predetermined amount of time within the geographic region.

2. The method of claim 1 wherein the determining of the first transaction aggregate is based on a demographic characteristic.

3. The method of claim 1 further comprising:
   determining a fifth transaction aggregate from the parsed transaction data response file, wherein the fifth transaction aggregate indicates a percentage of total credit card purchases made within the merchant category;
   determining a sixth transaction aggregate from the parsed transaction data response file, wherein the sixth transaction aggregate indicates a percentage of credit card purchases made at an online store of the merchant within the geographic region;
   determining a seventh transaction aggregate from the parsed transaction data response file, wherein the seventh transaction aggregate indicates a ratio of online to in-store purchases at the merchant category within the geographic region;
   and
   determining an eighth transaction aggregate from the parsed transaction data response file, wherein the eighth transaction aggregate indicates a classification of consumers within the geographic region.

4. The method of claim 1 wherein the geographic region comprises a zip code.

5. The method of claim 1 further comprising receiving a transaction level aggregate request file from an information requester and wherein the transaction data inquiry file is based on the transaction level aggregate request file.

6. The method of claim 1 wherein the determining of the first transaction aggregate is based on a group characteristic that comprises an IP address range.

7. The method of claim 6 wherein the IP address is correlated to one or more zip codes.

8. The method of claim 7 wherein the zip codes are based on the location of one or more information requesters.

9. The method of claim 1 wherein the first transaction aggregate is further based on a group characteristic.

10. The method of claim 1 wherein the first transaction aggregate is associated with one or more user identifiers.

11. The method of claim 1 further comprising determining a fifth transaction aggregate from the parsed transaction data response file using the aggregator server, wherein the fifth transaction aggregate is based on a group characteristic.

12. A transaction aggregator for deriving aggregated transaction level data comprising a server computer comprising:
   (a) a processor;
   (b) a non-transitory computer readable storage medium coupled to the processor, the computer readable storage medium comprising code that, when executed by the processor, causes the server computer at least to perform:
   sending a transaction data inquiry file to a transaction database of a financial transaction processing network,
   receiving a transaction data response file from the transaction database, the transaction data response file comprising financial information,
   parsing the transaction data response file according to the transaction data inquiry file;
   determining a first transaction aggregate from the parsed transaction data response file, wherein the first transaction aggregate indicates a ratio of online to in-store purchases within a geographic region;
   determining a second transaction aggregate from the parsed transaction data response file, wherein the second transaction aggregate indicates a total number of consumers with a revolving balance on a credit card account within the geographic region;
   determining a third transaction aggregate from the parsed transaction data response file, wherein the third transaction aggregate indicates a total spent in a merchant category within a predetermined amount of time within the geographic region; and
   determining a fourth transaction aggregate from the parsed transaction data response file, wherein the fourth transaction aggregate indicates an average amount spent at a merchant within the predetermined amount of time within the geographic region.

13. The transaction aggregator of claim 12 wherein the determining of the first transaction aggregate is based on a demographic characteristic.

14. The transaction aggregator of claim 12 wherein the code, when executed by the processor, further causes the server computer to:
   determine a fifth transaction aggregate from the parsed transaction data response file, wherein the fifth transaction aggregate indicates a percentage of total credit card purchases made within the merchant category;
   determine a sixth transaction aggregate from the parsed transaction data response file, wherein the sixth transaction aggregate indicates a percentage of credit card purchases made at an online store of the merchant within the geographic region;

determine a seventh transaction aggregate from the parsed transaction data response file, wherein the seventh transaction aggregate indicates a ratio of online to in-store purchases at the merchant category within the geographic region; and determine an eighth transaction aggregate from the parsed transaction data response file, wherein the eighth transaction aggregate indicates a classification of consumers within the geographic region.

15. The transaction aggregator of claim 12 wherein the geographic region comprises a zip code.

16. The transaction aggregator of claim 12 wherein the code, when executed by the processor, causes the server computer to receive a transaction level aggregate request file from a first information requester and wherein the transaction data inquiry file is based on the transaction level aggregate request file.

17. The transaction aggregator of claim 12 wherein the determining of the first transaction aggregate is based on a first group characteristic that comprises an IP address range.

18. The transaction aggregator of claim 17 wherein the IP address is correlated to one or more zip codes.

19. The transaction aggregator of claim 18 wherein the zip codes are based on the location of one or information requesters.

20. The transaction aggregator of claim 12 wherein the first transaction aggregate is further based on a second group characteristic.

21. The transaction aggregator of claim 12 wherein the code, when executed by the processor, causes the server computer at least to determine a fifth transaction aggregate from the parsed transaction data response file using the aggregator server, wherein the fifth transaction aggregate is based on a group characteristic.

22. An apparatus comprising:
means for sending a transaction data inquiry file to a transaction database of a financial transaction processing network;
means for receiving a transaction data response file from the transaction database, the transaction data response file comprising financial information;
means for parsing the transaction data response file according to the transaction data inquiry file;
means for determining a first transaction aggregate from the parsed transaction data response file, wherein the first transaction aggregate indicates a ratio of online to in-store purchases within a geographic region;
means for determining a second transaction aggregate from the parsed transaction data response file, wherein the second transaction aggregate indicates a total number of consumers with a revolving balance on a credit card account within the geographic region;
means for determining a third transaction aggregate from the parsed transaction data response file, wherein the third transaction aggregate indicates a total spent in a merchant category within a predetermined amount of time within the geographic region; and
means for determining a fourth transaction aggregate from the parsed transaction data response file, wherein the fourth transaction aggregate indicates an average amount spent at a merchant within the predetermined amount of time within the geographic region.

23. The apparatus of claim 22, further comprising:
means for determining a fifth transaction aggregate from the parsed transaction data response file, wherein the fifth transaction aggregate indicates a percentage of total credit card purchases made within the merchant category;
means for determining a sixth transaction aggregate from the parsed transaction data response file, wherein the sixth transaction aggregate indicates a percentage of credit card purchases made at an online store of the merchant within the geographic region;
means for determining a seventh transaction aggregate from the parsed transaction data response file, wherein the seventh transaction aggregate indicates a ratio of online to in-store purchases at the merchant category within the geographic region; and
means for determining an eighth transaction aggregate from the parsed transaction data response file, wherein the eighth transaction aggregate indicates a classification of consumers within the geographic region.

24. The apparatus of claim 22, further comprising means for determining a fifth transaction aggregate from the parsed transaction data response file, wherein the fifth transaction aggregate is based on a group characteristic.

25. A method for deriving aggregated transaction data comprising:
sending, by an aggregator server, a transaction data inquiry file from the aggregator server to a transaction database of a financial transaction processing network;
receiving, by the aggregator server, a transaction data response file from the transaction database, the transaction data response file comprising financial information;
parsing, by the aggregator server, the transaction data response file according to the transaction data inquiry file;
determining, by the aggregator server, a first transaction aggregate from the parsed transaction data response file based on a group characteristic that comprises an IP address range correlated to one or more zip codes, wherein the first transaction aggregate indicates a ratio of online to in-store purchases within a geographic region comprising a zip code;
determining a second transaction aggregate from the parsed transaction data response file, wherein the second transaction aggregate indicates a total number of consumers with a revolving balance on a credit card account within the geographic region;
determining, by the aggregator server, a third transaction aggregate from the parsed transaction data response file, wherein the third transaction aggregate indicates a total spent in a merchant category within a predetermined amount of time within the geographic region;
determining a fourth transaction aggregate from the parsed transaction data response file, wherein the fourth transaction aggregate indicates a percentage of total credit card purchases made within the merchant category;
determining a fifth transaction aggregate from the parsed transaction data response file, wherein the fifth transaction aggregate indicates a percentage of credit card purchases made at an online store of a merchant within the geographic region;
determining a sixth transaction aggregate from the parsed transaction data response file, wherein the sixth transaction aggregate indicates a ratio of online to in-store purchases at the merchant category within the geographic region;

determining, by the aggregator server, a seventh transaction aggregate from the parsed transaction data response file, wherein the seventh transaction aggregate indicates an average amount spent at the merchant within the predetermined amount of time within the geographic region; and determining an eighth transaction aggregate from the parsed transaction data response file, wherein the eighth transaction aggregate indicates a classification of consumers within the geographic region.

\* \* \* \* \*